United States Patent [19]

Nelson

[11] Patent Number: 5,393,021
[45] Date of Patent: Feb. 28, 1995

[54] CABLE HANGER

[75] Inventor: James W. Nelson, Cheshire, Conn.

[73] Assignee: Cablewave Systems, North Haven, Conn.

[21] Appl. No.: 207,348

[22] Filed: Mar. 7, 1994

[51] Int. Cl.$^6$ ............................................. F16B 15/00
[52] U.S. Cl. ...................................... 248/71; 248/73; 248/74.1
[58] Field of Search ................ 248/74.1, 71, 73, 68.1, 248/74.2, 74.3, 231.8; 24/457, 458

[56] References Cited

U.S. PATENT DOCUMENTS

| | | | |
|---|---|---|---|
| 2,682,385 | 6/1954 | Schluter | 248/71 X |
| 2,941,768 | 6/1960 | Elms | 248/71 |
| 3,131,447 | 5/1964 | Tinnerman | 248/231.8 |
| 3,237,905 | 3/1966 | Baker | 248/73 X |
| 3,444,596 | 5/1969 | Soltysik | 248/73 |
| 3,501,117 | 3/1970 | Soltysik | 248/71 |
| 4,763,132 | 8/1988 | Juds | 248/74.1 |
| 4,813,639 | 3/1989 | Midkiff et al. | |
| 4,958,792 | 9/1990 | Rinderer | 24/457 X |

FOREIGN PATENT DOCUMENTS 168882 10/1959 Sweden .................. 248/73

Primary Examiner—J. Franklin Foss
Attorney, Agent, or Firm—Ware, Fressola, Van Der Sluys & Adolphson

[57] ABSTRACT

A cable hanger includes a hinge section, a cable retention section and a structure attachment section. The structure attachment section includes first and second locking fingers extending from the cable retention section toward the open end of the cable hanger. Each locking member has an outwardly facing concave cross-section and is provided with a pair of locking barbs extending outwardly from the ends thereof. The barbs are dimensioned to extend over and contact the inner surface of the support structure about the attachment opening and thereby retain the cable hanger within the attachment opening. Thus, the cable hanger makes contact with the inner surface of the support structure at four (4) discrete locations.

19 Claims, 2 Drawing Sheets

CABLE HANGER

BACKGROUND OF THE INVENTION

1. Field Of the Invention

The present invention generally relates to a cable hanger and, in particular, relates to one such cable hanger including a pair of locking members each having an outwardly facing concave cross-section for establishing multiple point contact for retaining the cable hanger to a support structure.

2. Description of the Prior Art

Cable hangers, or clamps, have been in use for many years. Typically, such cable hangers are used to attach a cable to a supporting structure, for example, a tower. The use of supporting structures for antenna, or the like, has been known for many years. However, with the advancement and increased use of communications technology, such as cellular telephone systems, the use of towers and other support structures has increased significantly. In general, in order to ensure line of sight communications among the various antenna of a communications system, towers must be of considerable height. Because of the general safety considerations as well as the time and expense involved with installing such systems, it is highly desirable to minimize both the amount of time and the complexity of the work required for running cables along support structures. Consequently, cable hangers that can be used to rapidly attached cables to support structures without the need for conventional hardware, such as bolts, washers, nuts, or other small parts, have been developed.

In order to accommodate such cable hangers, the manufacturers of support structures provide fairly standardized cable attachment openings in various members, usually cross members, of such support structures during the manufacturing process. Typically, such attachment openings are formed to a nominal diameter of ¾ inch and are formed in the structural member, for example, by drilling or punching, prior to a final finishing, or galvanizing, process. Such structural members have a nominal thickness of ⅛ inch. It has been found, however, that although the attachment openings have a nominal diameter of ¾ inch, variations can occur in the surface finishing process that can result in difficulties for attaching conventional cable hangers thereto. For example, excess or irregular galvanizing can result in bubbles or irregular protuberances that extend either from the surface of the support member about the attachment opening or extend into the attachment openings. Another difficulty of such attachment openings is that there can be significant variations in the chamfer of the attachment openings, the chamfer being generally dependent upon the sharpness of the tool or die used to form the attachment openings in the support member.

One known specialized cable hanger is shown and described in U.S. Pat. No. 4,763,132, entitled Resilient One Piece Waveguide Hanger Interlockable With Antenna Tower, issued to Juds et at. on Aug. 9, 1988. The specialized cable hanger contemplated therein is designed for use only with cables that have an elliptical cross-section. Characteristic of this specialized cable hanger is the incorporation of a pair of finger-like prongs for attachment to a tower, or support structure. As described therein, each of the finger-like prongs is provided with a single outwardly extending detent. The finger-like prongs are generally semicircular in cross-section with the outboard side being curved to about the same radius of curvature as the attachment opening. In operation, the finger-like prongs are compressed and inserted through the attachment opening. Upon release of the compression force, the finger-like prongs expand such that the two detents contact the inner surface of the support member and the outboard surface of the finger-like prongs contact the inside of the attachment opening.

The finger-like prongs are designed to be urged toward the inside surface of the attachment openings and the two detents are designed to abut the inner surface of the support member about the attachment openings. The cable hanger further includes a plurality of feet that exert a spring force against the outer surface of the support member about the attachment opening. The feet thus urge the two detents against the inner surface of the support member and thereby retain the cable hanger, and the cable, to the support member.

Such an arrangement, has some drawbacks. For example, because of variations in the finishing of the attachment openings, the outboard surfaces of the prongs of the prior art specialized cable hanger may not be securely located within the inside surface of the attachment opening. For example, the presence of a non-uniformity, such as a bubble, in the galvanizing finish of the attachment opening can result in the outboard surfaces of the finger-like prongs contacting only the bubble surface rather than the inside surface of the attachment opening. Consequently, the detent associated with that finger-like prong would not fully contact the inner surface of the support member. Further, such bubbles, or protuberances can occur on the inner surface of the support member about the attachment opening as well and thereby prevent one or both of the detents from making full contact with the inner surface of the support member.

Another drawback occurs when the contact surfaces of the two detents do not fully abut the inner surface of the support member about the attachment opening. This can occur because of variations in the chamfer of the attachment openings. These conditions can cause the cable hanger to slip free of the attachment opening. Such slippage could thus allow the cable to become loose at one or more points along the length of the cable and result in deterioration of the cable and thus the communication service. Further, such an occurrence would require immediate attention which could be hazardous, time consuming and expensive. In some systems it may be desireable for a plurality of cables to be installed in a non-interfering manner along the same support structure. Such a system is shown and described in U.S. Pat. No. 4,813,639 entitled Cluster Mounting System For Supporting Coaxial Cables And The Like, issued to Midkiff et at. on Mar. 21, 1989. Therein, a mounting bracket arrangement includes a plurality of flat surfaces. Each flat surface is provided with an attachment opening through which a cable hanger may be attached.

Such a system is nonetheless subject to the above-recited difficulties since the bracket is, in essence, merely another form of a support member.

Consequently, it is highly desirable and of considerable interest to the telecommunication community to provide hence a cable hanger that provides, inter alia, a consistent, secure attachment to a support structure.

SUMMARY OF THE INVENTION

Accordingly, it is one object of the present invention to provide a cable hanger that substantially completely overcomes the above-recited drawbacks of the prior art cable hangers.

This object is accomplished, at least in part, by a cable hanger having a pair of locking members each of which has an outwardly facing concave cross-section such that, when attached to a support structure, each locking member securely contacts the support structure at two discrete locations.

Other objects and advantages will become apparent to those skilled in the art from the following detailed description of the invention read in conjunction with the appended claims and the drawings attached hereto.

BRIEF DESCRIPTION OF THE DRAWINGS

The drawings, not drawn to scale, include.

DETAILED DESCRIPTION OF THE PREFERRED EMBODIMENT

Figure 2:
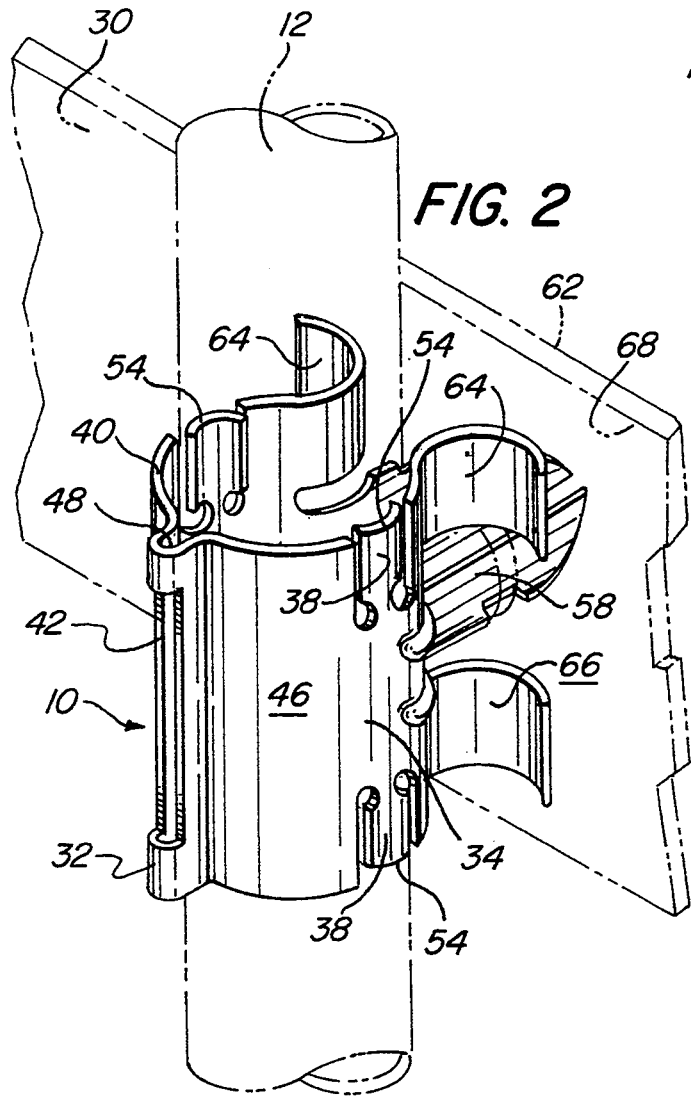
FIG. 2 is a perspective view of the cable hanger shown in FIG. 1 in use and depicting, in phantom, a cable being held.
Figure 1:
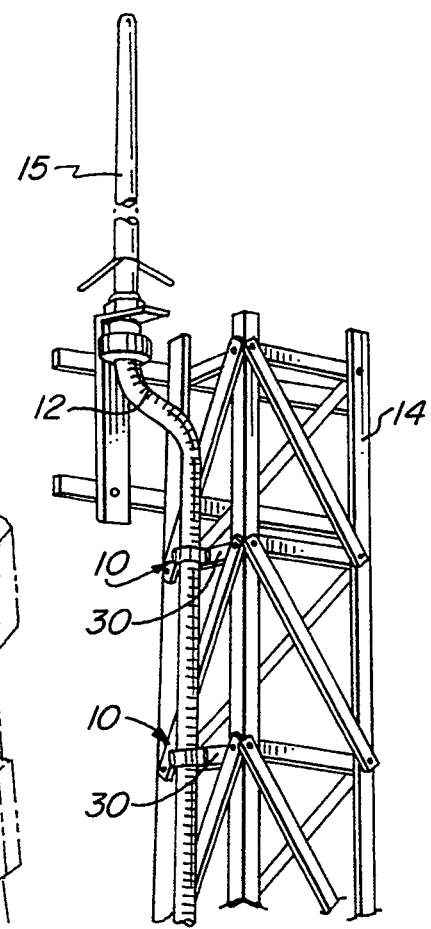
FIG. 1 which is a pictorial of a support structure tower showing a cable supported by cable hangers embodying the principles of the present invention.
Figure 1:
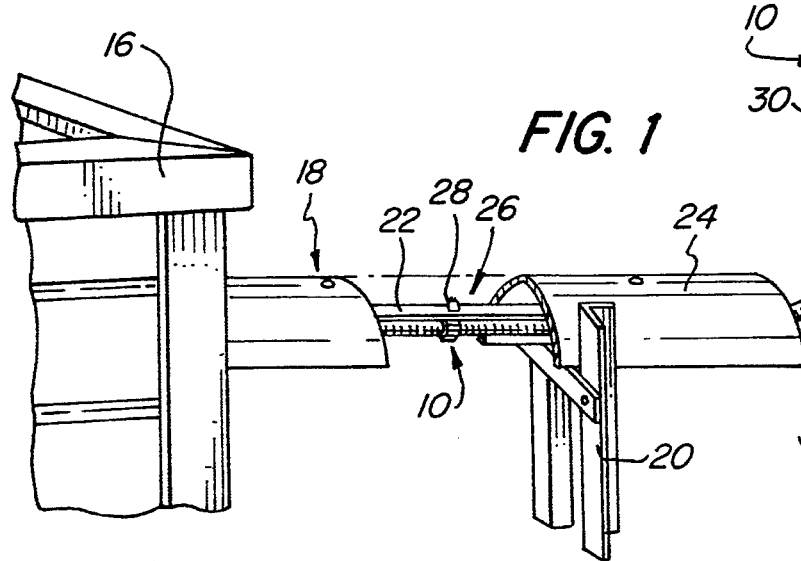
Figure 3:
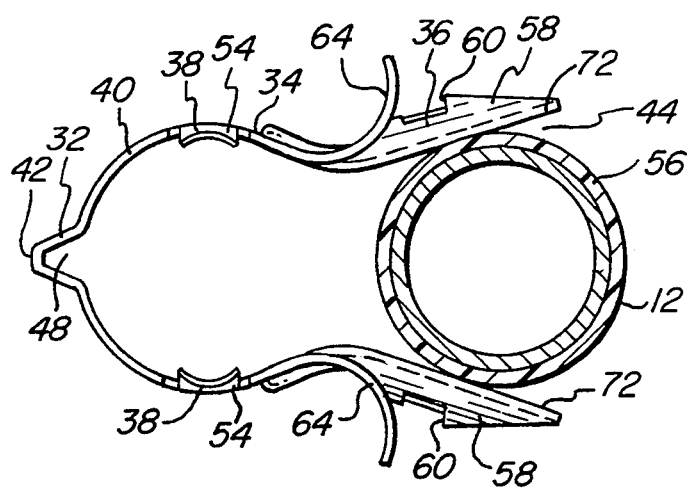
FIG. 3 is a top plan view of the cable hanger shown in FIG. 2 in the open position and showing a cable to be secured.

A typical installation wherein a cable hanger, generally indicated at 10 at the Figures and embodying the principles of the present invention, is particularly useful is shown in FIG. 1. Therein a cable 12 is shown installed along a support structure 14, such as a tower, and an equipment facility 16. In general, the cable 12 extends from the equipment facility 16 to the support structure 14 along a cable bridge 18. As illustrated, the cable bridge 18 is supported along its length by at least one ground support member 20. The cable 12 is attached to a rigid bridge member 22 by one or more cable hangers within the cable bridge 18 to prevent cable sag between the equipment facility 16 and the tower 14. Generally, the cable bridge 18 is provided with a protective covering 24 to prevent continued direct exposure of the cable 12 to the elements and to provide some protection against damage from falling objects. For a more complete understanding of the present invention, a section of the covering 24 has been omitted in FIG. 1 to expose the area 26 to enable a more detailed illustration of a typical bridge structure.

The cable 12, upon exiting the cable bridge 18, extends along the support structure 14 where it is usually connected to a communications antenna 15 mounted thereon. The cable 12 is securely attached to the support structure 14 at a plurality of points by the cable hangers 10. As shown, the cable hangers 10 are attached through attachment openings 28 in the support members 30 of the tower which in many cases, are integral support members of the tower. As used herein the term "support member" can also include a bracket having a plurality of attachment openings 28 wherein a plurality of cable hangers 10 may be mounted. In general, the tower can have a height of many hundreds of feet. Further, the cable 12 is usually attached thereto at intervals of about 3-4 feet. Hence, the number of cable hangers 10 employed in a single cable installation can be quite substantial.

In the preferred embodiment, the cable hanger 10 embodying the principles of the present invention includes a hinge section 32, a cable retention section 34 and a structure attachment section 36. In the preferred embodiment, the cable hanger 10 further includes means 38, integral with the cable retention section 34, for securing the cable, 12 therewithin.

In this embodiment, the cable hanger 10 is fabricated from a unitary piece of resilient material 40. The cable hanger 10 is generally U-shaped in cross-section having a closed end 42 and an open end 44 and side walls 46. Briefly, in use, the cable 12 is inserted into the cable retention section 34 via the open end 44 and the cable hanger 10 is then secured to the support structure 14 via the structure attachment section 36. As more fully discussed herein, the use of a resilient material enables the cable hanger 10 to be readily expanded at the open end 44 to allow the rapid insertion of the of the cable 12 into the cable contact section 34 as well as to allow both the compression of the structure attachment section 36 to enable insertion of the cable hanger 10 into an attachment opening 28 and, subsequently, the expansion of the structure attachment section 36 to secure the cable hanger 10 to the support structure 14. In one particular embodiment, the cable hanger 10 is formed from stainless steel having a thickness of about 1/32 of an inch and a side wall height of about 1.75 inches. It will be understood that the material as well as the thickness and/or the side wall height of the cable hanger 10 may be varied to accommodate different size cables 12, conditions, and the like.

In the preferred embodiment, the hinge section 22 is disposed at the closed end 42 of the unitary piece of resilient material 40. The hinge section 32 includes a narrow slot 48 formed at the closed end 40 of the unitary body of material 40. Preferably, the narrow slot 48 extends outwardly from the cable retention section 34 and thus reduces the force required to expand or compress the open end 44. As a result, a cable 12 can be quite easily inserted into the cable retention section 34 of the cable hanger 10. Further, such a hinge section 32 provides the cable hanger 10 with the ability to accept cables 12 over a wide range of cable diameter tolerances. The spring force of the hinge section 32 is primarily controlled by the choice of material, the thickness of the material, the slot width, the slot length. In one particular embodiment wherein a cable having a nominal outside diameter of about 1.125 inches is to be attached to the support structure 14, the narrow slot 48 has a width of about 0.25 of an inch and a length of about 1.25 of an inch.

Figure 4:
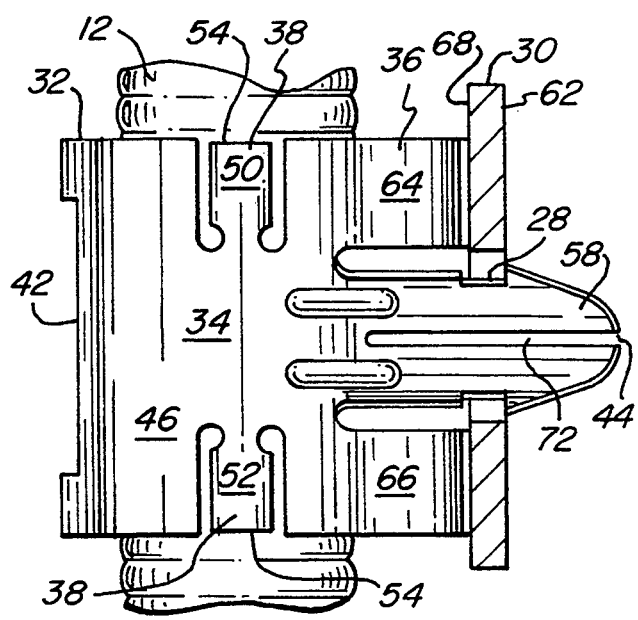
FIG. 4 is a side view of the cable hanger shown in FIG. 2.
Figure 6:
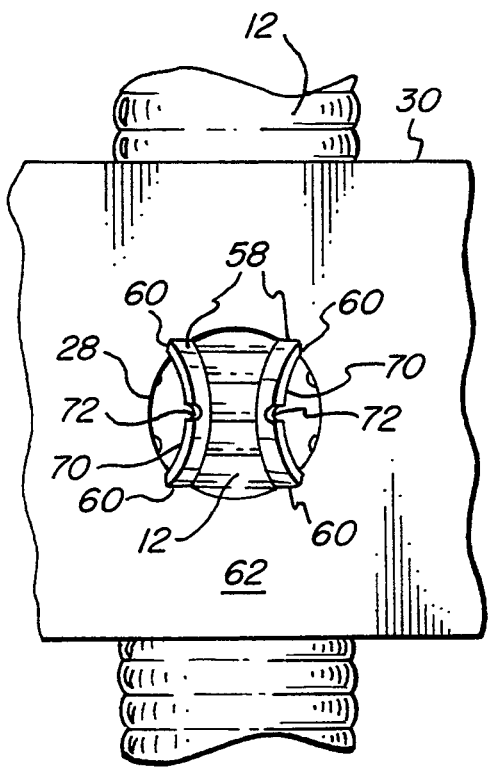
FIG. 6 is a plan view of the attached cable hanger shown in FIG. 5 showing the multiple attachment points thereof.
Figure 5:
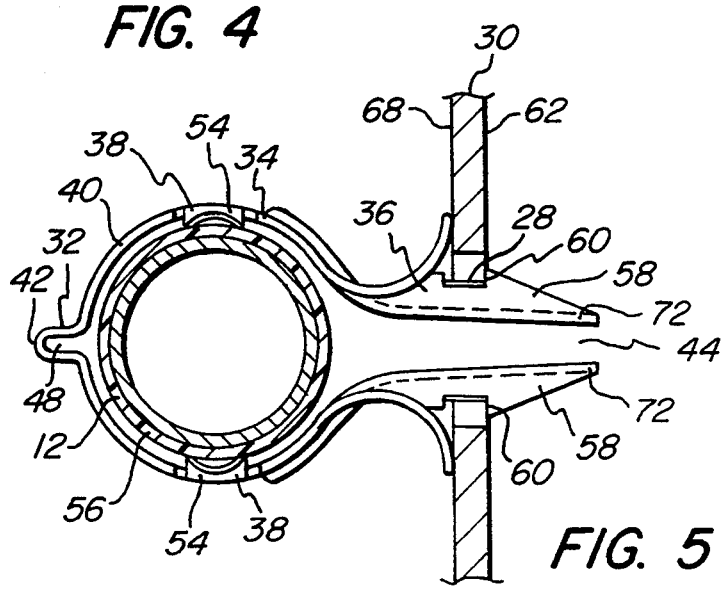
FIG. 5 is a top plan view of the cable hanger shown in FIG. 2 attached to a support member and including a cable secured therewithin.

The cable retention section 34 is generally circular in cross-section and each side wall 46 has means 38 integral therewith for securing the cable 12 therein. Preferably, as particularly well shown in FIG. 4, the means 38 includes at least one upper pair and one lower pair of cable contact fingers, 50 and 52, respectively. Preferably, each pair of cable contact fingers, 50 and 52, are disposed across from each other in the side walls 46.

The fingers are disposed in opposite directions and generally extend in a direction parallel with the length of the cable 12. The cable contact fingers, 50 and 52, are preferably bent inwardly so that, when the cable hanger 10 is attached, the cable contact fingers, 50 and 52, exert a holding force against the cable 12. In addition, in one embodiment, the free end 54 of each of the cable contact fingers, 50 and 52 are shaped to have a smaller radius of curvature than that of the cable retention section 34. Such an arrangement enables the cable contact fingers, 50 and 52, to bite into the insulation layer 56 disposed about the cable 12 and thus provide a more secure retention. By disposing the upper pair and lower pair of cable contact fingers, 50 and 52, in this manner, the cable 12 is contacted at two positions vertically and two positions horizontally. Hence, the vertical retention forces are exerted in opposite directions along the cable 12 to thereby preventing longitudinal, or axial, movement of the cable 12 within the cable hanger 10. The horizontal retention forces maintain the cable 12 substantially central within the cable retention section 34. It will be readily understood that the forces exerted by the cable contact fingers, 50 and 52, against the cable 12 are dependent, inter alia, upon the amount of inward bending and the restraint of the expansion of the open end 44 by the attachment opening 28. Thus, the cable retention section 34 securely holds a cable 12 within the cable hanger 10 over a wide range of cable diameter tolerances. The cable hanger 10 may, of course, be formed with different sized cable retention sections 34 depending upon the nominal diameter of the cable 12 to be attached to the support structure 14.

In the embodiment shown, the structure attachment section 36 includes first and second locking members 58 extending from the cable retention section 34 toward the open end 44 of the cable hanger 10. Preferably, the locking members 58 are disposed centrally along the side wall 46 of the cable hanger 10 and cooperatively sized with the attachment opening 28 to enable the locking members 58 to be inserted therethrough. In the embodiment shown, each locking member 58 has an outwardly facing concave cross-section. In the preferred embodiment, each locking member 58 is provided with a pair of locking barbs 60 extending outwardly thereof. The barbs are dimensioned and located to extend over and contact the inner surface 62 about the attachment opening 28 of the support structure 14 and thereby retain the cable hanger 10 within the attachment opening 20. Thus, the cable hanger 10 makes contact with the inner surface 62 of the support structure 14 at four (4) discrete locations.

The structure attachment section 36 further includes, in the preferred embodiment, an upper pair and a lower pair of spring pads, 64 and 66, respectively. Each spring pad is preferably formed by an outwardly facing reverse curve. The reverse curves are disposed and cooperatively sized to exert a force against the outer surface 68 of the support structure 14 about the attachment opening 28 to urge the locking barbs 60 against the inner surface 62 thereof. Hence, the cable hanger 10 is retained within the attachment opening 28 and prevented from movement therewithin when installed.

In operation, after a cable 12 is inserted in the cable retention section 34 the locking members 58 are compressed toward each other and inserted into the attachment opening 28 until the locking barbs 60 are completely through the attachment opening 28. During insertion, the spring pads, 64 and 66, contact the outer surface 68 of the support structure 14 and are compressed thereagainst. Thereafter, the locking members 58 are released and the locking members 58 expand such that the locking barbs 60 contact the inner surface 62 of the support structure 14 about the attachment opening 28 and the spring pads, 64 and 66, exert an opposing retention force to retain the cable hanger 10 in place.

In one preferred embodiment, each of the outwardly facing surfaces, 70 of the locking members 58 is provided with a slot 72 extending along the length thereof. In one embodiment, each slot 72 extends along the locking member 58 from a point proximate the cable retention section 34. Each slot 72 acts like a hinge within the locking member 58. As a result, each locking barb 60 can independently react to variations on the inner surface 62 of the support structure 14 about the attachment opening 28. Further, the slots 72 provide each locking member 58 with increased flexibility allowing the provision of locking barbs 60 that are comparatively larger than conventional barbs. Hence, the locking barbs 60 can be made to extend beyond oversized chamfers and thus improve the locking capability of the cable hanger 10. In addition, such larger locking barbs 60 increases the surface area of the inner surface 62 contacted by the locking barbs 60 and hence improves the retention of the cable hanger 10 within the attachment opening 28.

Although the present invention has been described with respect to one or more particular arrangements or embodiments, it will be understood that other arrangements and configurations may also be made which do not depart from the spirit and scope of the present invention. Hence, the present invention is limited only by the appended claims and a reasonable interpretation thereof.

What is claimed is:

1. A cable hanger comprising:
   a hinge section;
   a cable retention section; said cable retention section having said hinge section extending therefrom; and
   a structure attachment section, said structure attachment section having first and second locking members extending from said cable retention section, each locking member having an outwardly facing concave cross-section and is sized to pass through an attachment opening in a support structure when compressed toward each other such that upon expansion, each said locking member contacts said support structure at no less than two discrete locations.

2. The cable hanger as claimed in claim 1, wherein said hinge section, said cable retention section and said structure attachment section are formed from a unitary piece of resilient material.

3. The cable hanger as claimed in claim 2 wherein said unitary piece of material is generally U-shaped in cross-section having a closed end, an open end and side walls.

4. The cable hanger as claimed in claim 1 wherein said cable hanger is generally U-shaped in cross-section having a closed end, an open end and side walls and wherein said hinge section includes a slot disposed at said closed end.

5. The cable hanger as claimed in claim 4 wherein said slot extends away from said cable retention section such that the force needed to insert a cable into said cable retention section is reduced.

6. The cable hanger as claimed in claim 5 wherein said slot has a length of about 1.25 inches and a width of about 0.25 of an inch.

7. The cable hanger as claimed in claim 4 wherein said cable retention section is generally circular in cross-section and includes means for securing a cable therewithin.

8. The cable hanger as claimed in claim 7 wherein said means for securing a cable within said cable retention section includes at least one upper pair and one lower pair of cable contact finger disposed in opposite directions.

9. The cable hanger as claimed in claim 8 wherein said fingers are disposed parallel to the length of a cable disposed within said cable retention section.

10. The cable hanger as claimed in claim 8 wherein the cable contact fingers of each pair are disposed opposite each other.

11. The cable hanger as claimed in claim 8, wherein each cable contact finger extends inwardly into the cable retention section.

12. The cable hanger as claimed in claim 8 wherein the cross-sectional radius of curvature of the free end of each said cable contact finger is less than the radius of curvature of said cable retention section.

13. The cable hanger as claimed in claim 1 wherein each said locking member includes at least two locking barbs extending outwardly therefrom.

14. The cable hanger as claimed in claim 13 wherein, when said locking member includes a lateral slot extending into the outwardly facing concave surface thereof.

15. The cable hanger as claimed in claim 14 wherein said structure attachment section further includes:
an upper pair and a lower pair of spring pads, said spring pads being disposed above and below said locking fingers.

16. The cable hanger as claimed in claim 15 wherein each spring pad is an outwardly facing reverse curve of material.

17. A method of attaching a cable to a support structure comprising the steps of:
inserting said cable into a cable retention section of a cable hanger; and thereafter
inserting a pair of locking members extending from said cable retention section through an attachment opening in said support structure such that at least four locking barbs, extending from said locking members, contact the inner surface of said attachment opening.

18. The method as claimed in claim 17 further including the step of:
forming each said locking member with an outwardly facing concave cross-section and providing each said locking member with at least one pair of said locking barbs.

19. The method as claimed in claim 18 further including the step of:
forming each said locking member with a slot in the outwardly facing surface along the length thereof.

* * * * *

UNITED STATES PATENT AND TRADEMARK OFFICE
CERTIFICATE OF CORRECTION

PATENT NO. : 5,393,021
DATED : February 28, 1995
INVENTOR(S) : JAMES W. NELSON

It is certified that error appears in the above-indentified patent and that said Letters Patent is hereby corrected as shown below:

Column 6, line 62, "wails" should be --walls--.

Signed and Sealed this

Eighteenth Day of July, 1995

Attest:

BRUCE LEHMAN

*Attesting Officer*   *Commissioner of Patents and Trademarks*